(12) United States Patent
Jeon et al.

(10) Patent No.: US 12,030,754 B1
(45) Date of Patent: Jul. 9, 2024

(54) SELF-CLIMBING TYPE CRANE APPARATUS FOR INSTALLING AND MAINTAINING WIND POWER GENERATION SYSTEM

(71) Applicant: POWER MNC CO., LTD., Yangsan-si (KR)

(72) Inventors: Jae Young Jeon, Yangsan-si (KR); Mahn Jung Yoon, Yangsan-si (KR)

(73) Assignee: POWER MNC CO., LTD., Yangsan-si (KR)

( * ) Notice: Subject to any disclaimer, the term of this patent is extended or adjusted under 35 U.S.C. 154(b) by 0 days.

(21) Appl. No.: 18/557,035

(22) PCT Filed: Dec. 2, 2021

(86) PCT No.: PCT/KR2021/018085
§ 371 (c)(1),
(2) Date: Oct. 24, 2023

(87) PCT Pub. No.: WO2022/231086
PCT Pub. Date: Nov. 3, 2022

(30) Foreign Application Priority Data

Apr. 26, 2021 (KR) .......................... 10-2021-0053478

(51) Int. Cl.
*B66C 23/20* (2006.01)
*B66C 23/62* (2006.01)
*F03D 13/10* (2016.01)

(52) U.S. Cl.
CPC ............ *B66C 23/207* (2013.01); *B66C 23/62* (2013.01); *F03D 13/112* (2023.08); *F03D 13/139* (2023.08)

(58) Field of Classification Search
CPC ....... B66C 23/207; B66C 23/62; B66C 23/32; F03D 13/112; F03D 13/139
See application file for complete search history.

(56) References Cited

U.S. PATENT DOCUMENTS

| 3,485,384 A * | 12/1969 | Kojima ................... B66C 23/32 |
| | | 212/270 |
| 3,998,029 A * | 12/1976 | James ..................... B66C 23/32 |
| | | 212/176 |

(Continued)

FOREIGN PATENT DOCUMENTS

| CN | 107265373 A | 10/2017 |
| CN | 108821133 A | 11/2018 |

(Continued)

OTHER PUBLICATIONS

CN 108821133A Machine Translation. (Year: 2020).*

(Continued)

*Primary Examiner* — Michael R Mansen
*Assistant Examiner* — Juan J Campos, Jr.
(74) *Attorney, Agent, or Firm* — BROADVIEW IP LAW, PC

(57) ABSTRACT

A crane apparatus of the present invention is configured to install a tower and a wind power generation system and includes an elevation unit configured to be movable upward or downward, and a crane unit configured to raise an element that constitutes the wind power generation system, in which the elevation unit includes upper and lower bases configured to switch between a state in which the upper and lower bases are supported on the tower and a state in which the upper and lower bases are movable, a plurality of posts configured to fix the upper and lower bases to each other, a lifting base configured to switch between a state in which the lifting base is supported on the tower and a state in which the lifting base is movable, and a drive device configured to change distances between the lifting base and the upper and lower bases.

6 Claims, 12 Drawing Sheets

(56) References Cited

U.S. PATENT DOCUMENTS

| | | | | |
|---|---|---|---|---|
| 7,147,117 | B2* | 12/2006 | Davis | B66C 23/32 |
| | | | | 212/203 |
| 7,290,672 | B2* | 11/2007 | Davis | B66C 23/32 |
| | | | | 212/175 |
| 10,865,077 | B2* | 12/2020 | Garitaonandia Aramberri | ............ |
| | | | | B66C 23/185 |
| 2002/0134745 | A1* | 9/2002 | Jurimae | B66C 23/32 |
| | | | | 212/179 |
| 2003/0121875 | A1* | 7/2003 | Davis | B66C 23/32 |
| | | | | 212/179 |
| 2018/0290864 | A1* | 10/2018 | Garitaonandia Aramberri | ............ |
| | | | | E04H 12/348 |
| 2021/0292134 | A1* | 9/2021 | Kalanj | B66C 23/32 |

FOREIGN PATENT DOCUMENTS

| | | | |
|---|---|---|---|
| CN | 111547630 | A | 8/2020 |
| JP | 2022-519449 | A | 3/2022 |
| KR | 10-2009-0033963 | A | 4/2009 |
| KR | 10-1225691 | B1 | 1/2013 |
| WO | 2017/055598 | A1 | 4/2017 |
| WO | 2023/022600 | A1 | 2/2023 |

OTHER PUBLICATIONS

KR 20090033963A Machine Translation (Year: 2009).*
International Search Report for PCT/KR2021/018085 by Korean Intellectual Property Office dated Mar. 4, 2022.
Notice of Allowance for JP 2023-564238 by Japan Patent Office dated May 14, 2024.

* cited by examiner

SELF-CLIMBING TYPE CRANE APPARATUS FOR INSTALLING AND MAINTAINING WIND POWER GENERATION SYSTEM

CROSS-REFERENCE TO RELATED APPLICATIONS

This application is a National Phase Entry Application of PCT Application No. PCT/KR2021/018085 filed on Dec. 2, 2021, which claims priority to Korean Patent Application No. 10-2021-0053478 filed on Apr. 26, 2021, in Korean Intellectual Property Office, the entire contents of which are hereby incorporated by reference in its entirety.

TECHNICAL FIELD

The present invention relates to a self-climbing type crane apparatus for installing and maintaining a wind power generation system, and more particularly, to a crane apparatus provided in a wind power generation system including a tower vertically installed on the ground, and a wind power generator installed at an upper end of the tower, the crane apparatus being used to install or maintain a wind power generation system by pulling up and down items such as the tower or the turbine, which constitutes the wind power generation system, while autonomously climbing the tower upward and downward.

BACKGROUND ART

In the case of a wind power generation system installed on the ground, a tower is installed vertically on the ground surface, a nacelle, in which a wind power turbine is disposed, is provided at an upper end of the tower, and a blade is coupled to the turbine.

In order to implement efficient wind power generation, a height of the tower increases, and a size of the blade or wind power turbine also increases. Therefore, a crane apparatus for installing the wind power generation system also increases in height and size.

Because a supply of the large-capacity crane is limited, it is difficult to adopt the large-scale crane to construct or maintain the wind power tower system in a timely manner. In particular, the wind power generation systems are often installed in mountainous areas. It is difficult to transport the high-rise large-capacity crane to the mountainous area, and sufficient workspaces are not ensured at sites, which makes it difficult to perform a working process with the large-scale crane.

In order to solve the above-mentioned problems, a so-called "self-climbing type crane apparatus" has been developed.

The self-climbing type crane apparatus has a crane installed on a climbing device that moves upward or downward along the tower of the wind power generation system. As the climbing device climbs the tower, the crane can lift elements, i.e., a tower unit, a blade, a nacelle, and the like, which constitute the wind power generation system, to installation positions, or the crane lowers disassembled elements.

As the invention related to the self-climbing type crane apparatus, there has been proposed International Patent Publication No WO2017055598 (Document 1) entitled "Hoisting System for Installing Wind Power Turbine".

The hoisting system of the invention of Document 1 is configured such that a lifting structure is installed on a tower of a wind power generation system, and a lifting main body having a crane moves the tower upward or downward by using the structure.

In order to use the hoisting system of the invention of Document 1, the lifting structure needs to be installed on the tower, which causes a problem in that it is difficult to use the hoisting system to maintain the wind power generation system that has been constructed and is being operated.

As another example of the self lifting type crane apparatus, there has been disclosed Chinese Patent Application Laid-Open No. CN107265373A (Document 2) entitled "Dedicated Tool for Wind Electricity Maintenance Crane Arm Structure".

The apparatus according to the invention of Document 2 is configured such that a plurality of holding arms, which is spaced apart from one another vertically while surrounding a tower, is coupled to a cylinder extending vertically. The holding arms are moved upward or downward by the cylinder and are alternately attached to the tower, thereby providing a supporting force to the upward and downward movements.

The apparatus according to the invention of Document 2 may be used without changing the structure of the tower of the wind power generation system. However, the holding arms need to perform the upward and downward movements depending on forces, by which the holding arms hold the tower, and the holding arms need to support a load by which the crane performs a raising operation. For this reason, there are problems in that the structure of the holding arm is complicated, the upward and downward movements are complicated, a large amount of time is required, a large amount of time is required to assemble and disassemble the holding arm in the workplace, and the safety of the holding arm deteriorates.

In addition, in both the crane apparatuses of the inventions of Documents 1 and 2, the crane unit is attached to one side of the unit for moving the tower upward or downward. For this reason, there is a problem in that all the loads of the elevation unit and the crane unit and the load of the item raised by the crane are concentrated at one side of the tower, and a significantly eccentric load is applied to the tower.

DETAILED DESCRIPTION OF THE INVENTION

Technical Problem

An object of the present invention is to provide a crane apparatus equipped with a crane unit and configured to raise, install, disassemble, and maintain elements, which constitute the wind power generation system, while moving a tower, which constitutes the wind power generation system, upward or downward autonomously.

In particular, another object of the present invention is to provide a crane apparatus in which a device for climbing a tower of a wind power generation system upward or downward is simply implemented, configured to safely and efficiently move upward or downward, and safely and assuredly supported by a tower during the upward and downward movements and the work.

Technical Solution

The object to be achieved by the present invention is achieved by a crane apparatus according to the present invention for installing and maintaining a tower and a wind power generation system provided at an upper end of the tower.

The crane apparatus according to the present invention may include:

an elevation unit attached to the tower and configured to be movable upward or downward vertically along the tower; and a crane unit disposed above the elevation unit and configured to pull up and down an element that constitutes the wind power generation system, in which the elevation unit includes: upper and lower bases configured to surround the tower and switch between a state in which the upper and lower bases are fixedly supported at any position on the tower and a state in which the upper and lower bases are movable upward or downward relative to the tower: a plurality of posts extending between the upper and lower bases and configured to allow the upper and lower bases to be fixed to each other at a position at which the upper and lower bases are spaced apart from each other vertically: a lifting base configured to surround the tower and switch between a state in which the lifting base is fixedly supported at any position on the tower and a state in which the lifting base is movable upward or downward relative to the tower, the lifting base being disposed to be movable upward or downward between the upper and lower bases along the posts: and a drive device disposed between the lifting base and the upper base or lower base and configured to change distances between the lifting base and the upper and lower bases by changing a length thereof, in which the lifting base moves upward or downward along the tower as the length of the drive device is changed in a state in which the upper and lower bases are fixedly supported at any position on the tower, in which the upper and lower bases move upward or downward along the tower as the length of the drive device is changed in a state in which the lifting base is fixedly supported at any position on the tower, and in which the crane unit is disposed on the upper base.

According to the crane apparatus of the present invention configured as described above, the upper and lower bases alternately switch between the state in which the upper and lower bases are fixedly supported on the tower and the state in which the lifting base is fixedly supported while being synchronized with the extension and contraction operations of the drive device installed between the lifting base and any one of the upper and lower bases. Therefore, the crane apparatus moves upward or downward by the displacement of the extension or contraction operation of the drive device.

The structure including the upper and lower bases and the posts is integrated and moves upward or downward along the tower while being disposed to surround the tower, such that the structure is stably supported on the tower without applying an eccentric load to the tower.

Therefore, even in the working process of raising the item by using the crane unit in addition to the upward and downward operations, the eccentric load applied to the tower may be minimized, and the item, which constitutes the wind power generation system, may be raised in a state of being aligned with the tower.

According to the additional feature of the crane apparatus of the present invention, the upper and lower bases and the lifting base may respectively include frames extending on planes perpendicular to an extension direction of the tower, holes, which are penetrated by the tower, may be respectively formed in the frames, the frames may be each configured to be divided and coupled so that the hole penetrated by the tower is opened, the plurality of posts may be disposed to be spaced apart from one another in a circumferential direction of the tower and penetrate the lifting base so that the lifting base is slidable, a plurality of hydraulic cylinders may be provided as the drive device and extend between the frame of the lifting base and the frame of the upper or lower base, and the plurality of hydraulic cylinders may be operated to be extended or contracted and disposed to be spaced apart from one another in the circumferential direction of the tower.

As described above, because the upper and lower bases and the lifting base, which constitute the elevation unit, are configured by the frames that are divided and coupled, the upper and lower bases and the lifting base are transported in the divided state and assembled on the site to surround the tower.

Therefore, the upper and lower bases and the lifting base are easily transported to the site for the wind power generation system. After the upper and lower bases and the lifting base are assembled to the tower, the upper and lower bases and the lifting base define the structure that surrounds the tower, such that the upper and lower bases and the lifting base are stably supported on the tower without applying an eccentric load.

According to the additional feature of the crane apparatus of the present invention, brake devices may be provided and configured to selectively apply frictional forces in a diameter direction of the tower between the brake devices and a surface of the tower so that the upper and lower bases and the lifting base are fixedly supported at any position on the tower by the applied frictional forces, and the plurality of brake devices may be respectively disposed on the upper and lower bases and the lifting base and spaced apart from one another in the circumferential direction of the tower.

According to this configuration, the operation of fixedly supporting the upper and lower bases and the lifting base at any position on the tower is performed by the brake devices spaced apart from one another in the circumferential direction and configured to apply the frictional forces in the diameter direction.

Because the frictional force is directly applied in the diameter direction, a strong frictional force is applied, such that the upper and lower bases and the lifting base may be stably supported on the tower. In particular, because the frictional force is dispersed in the circumferential direction and applied, no eccentric load is applied to the tower and the crane apparatus.

According to the additional feature of the present invention, the upper and lower bases and the lifting base may respectively include frames extending on planes perpendicular to an extension direction of the tower, and the brake device may include: a block disposed on the frame and configured to be slid in the diameter direction of the tower by a hydraulic cylinder; and a friction pad disposed at a tip of the block and configured to apply a frictional force while coming into contact with the surface of the tower.

In addition, the crane apparatus may further include: a wire device disposed to extend along outer surfaces of the friction pads of the brake devices in the diameter direction and configured to prevent the friction pads from moving outward in the diameter direction of the tower.

The frictional force is applied by pressing the friction pad against the surface of the tower with the pressing force generated by the hydraulic cylinder. The wire prevents the friction pads from being separated from the surface of the tower even when the pressing force generated by the hydraulic cylinder is lost because of the abnormality of the hydraulic pressure system. Therefore, an accident in which the crane apparatus falls does not occur even when the pressing force generated by the hydraulic cylinder is lost.

As an aspect of the wire device, the wire device may include: an electric winch disposed on the frame of each of the upper and lower bases and the lifting base; and a wire having one end fixed to any one of the friction pads, and the other end coupled to the electric winch.

BEST MODE

Hereinafter, as specific details for carrying out the present invention, a configuration and operation of a crane apparatus according to one embodiment of the present invention will be described with reference to the drawings.

Figure 1:
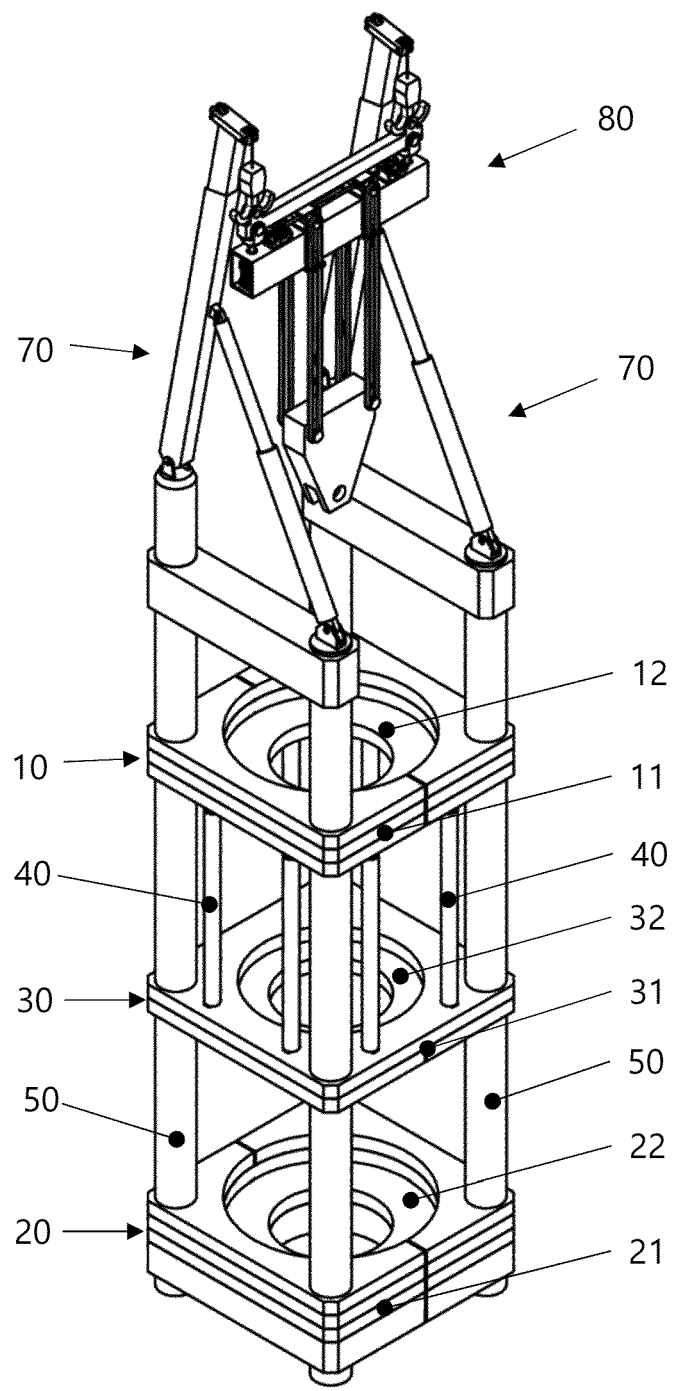
FIG. 1 is a perspective view illustrating a state in which a jig for raising nacelle is attached to a crane apparatus according to an embodiment of the present invention.
Figure 2:
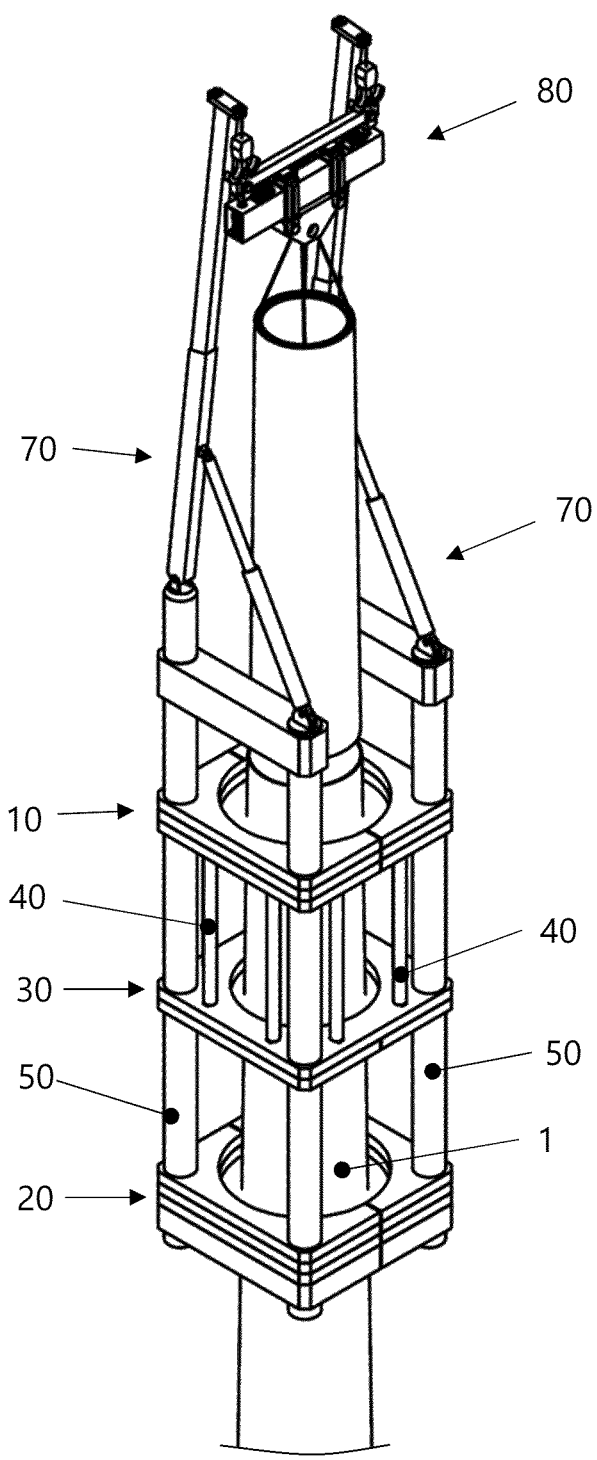
FIG. 2 is a perspective view illustrating a state in which the crane apparatus according to the embodiment of the present invention raises an upper unit of a tower of a wind power generation system in a state in which the crane apparatus is supported by the tower.

An overall configuration of the crane apparatus according to an embodiment will be described with reference to FIGS. 1 and 2.

The crane apparatus includes elevation units 10 to 50 attached to a tower 1 of a wind power generation system and configured to move upward or downward vertically along the tower, two crane units 70 disposed above the elevation units, and a lifting unit 80 suspended from the crane unit, configured to be moved upward or downward by the crane unit, and provided such that elements of the wind power generation system are suspended from the lifting unit 80.

With this configuration, for example, when the elevation units 10 to 50 move upward along the tower 1 and then reach a working position in a state in which the crane units 70 are mounted, the crane units 70 lower a raising hook (76 in FIG. 7) so that the raising hook are adjacent to the ground surface, and the crane units 70 suspend the lifting unit 80 from the raising hooks and then suspend the elements of the wind power generation system, such as a tower unit, a nacelle, or a blade placed on the ground, from the lifting unit 80. Next, the crane units 70 raise the lifting unit 80, dispose the elements of the wind power generation system, which are suspended from the lifting unit, and assemble the elements of the wind power generation system.

Overall configurations of the elevation units 10 to 50 will be described.

As the elevation units, an upper base 10, a lifting base 30, and a lower base 20 are provided to surround the tower 1, and the upper base 10, the lifting base 30, and the lower base 20 switch between a state in which the upper base 10, the lifting base 30, and the lower base 20 are fixedly supported at any position on the tower and a state in which the upper base 10, the lifting base 30, and the lower base 20 are movable upward or downward relative to the tower.

All the upper base 10, the lower base 20, and the lifting base 30 are configured as quadrangular frames 11, 21, and 31 extending on planes perpendicular to a vertical direction in which the tower 1 extends. Holes 12, 22, and 32, which are penetrated by the tower 1, are formed in inner centers of the frames 11, 21, and 31, such that the frames 11, 21, and 31 surround the tower 1.

The frames 11, 21, and 31 are each configured such that two pieces are separated or coupled so that each of the holes 12, 22, and 32 penetrated by the tower is opened in a semi-circular shape. The frames 11, 21, and 31 are each transported in a separated state to a site for installing or maintaining the wind power generation system, and then the frames 11, 21, and 31 are coupled to surround the tower 1.

The upper base 10 and the lower base 20 are integrated by being fixedly coupled to each other by four posts 50 disposed at four corners of the frames 11 and 21.

The posts 50 are installed vertically. The posts 50 are installed to vertically penetrate the frames 11, 21, and 31 of the upper and lower bases and the lifting base. The posts 50 are fixedly coupled to the frames 11 and 21 of the upper and lower bases, such that the upper and lower bases 10 and 20 are integrated by the posts 50.

The lifting base 30 is placed between the upper and lower bases 10 and 20 in the vertical direction, and the posts 50 penetrate the frame 31 of the lifting base. The frame 31 is not fixedly coupled so that the lifting base 30 and the posts 50 slide.

Eight hydraulic cylinders 40 are disposed between an upper surface of the frame 31 of the lifting base and a lower surface of the frame 11 of the upper base. The two hydraulic cylinders 40 are provided between the posts 50 when viewed in a plan view. One end of each of the hydraulic cylinders 40 is fixed to the upper surface of the frame 31 of the lifting base, and a piston tip of each of the hydraulic cylinders 40 is coupled to the lower surface of the frame 11 of the upper base.

With this configuration, when the hydraulic cylinders 40 are extended or contracted, the lifting base 30 relatively moves upward or downward as distances of the lifting base 30 from the upper and lower bases 10 and 20 vary.

Brake devices are provided on the upper base 10, the lower base 20, and the lifting base 30 and fixedly support the upper base 10, the lower base 20, and the lifting base 30 at any position on the tower.

A configuration of the brake device will be described with reference to FIG. 3.

Figure 3:
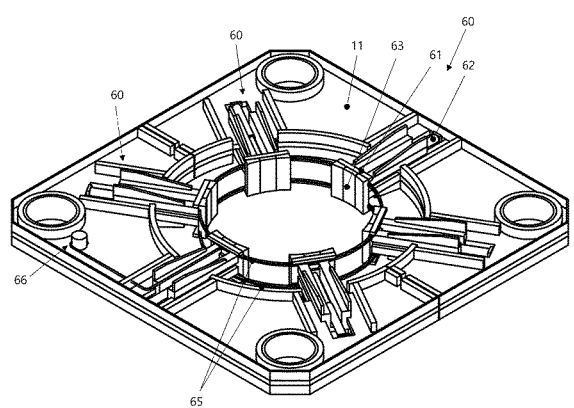
FIG. 3 is a perspective view illustrating a state in which a brake device is installed on an upper base of the crane apparatus according to the embodiment of the present invention.

FIG. 3 illustrates a state in which an upper plate of the frame 11 of the upper base is excluded and illustrates the brake device provided in the frame.

A brake device 60 is configured to selectively apply a frictional force between the brake device 60 and a surface of the tower and fixedly supports the upper and lower bases and the lifting base at any position on the tower by applying the frictional force.

Because the brake devices having the same configuration are installed on the upper and lower bases 10 and 20 and the lifting base 30, the brake device installed on the upper base illustrated in FIG. 3 will be described below.

One brake device includes a block 61 disposed on the frame 11 of the upper base and configured to slide in a diameter direction of the tower 1, a hydraulic cylinder 62 configured to press or retract the block in the diameter direction while being extended or contracted, and a friction pad 63 disposed at a tip of the block and configured to apply a frictional force while coming into contact with the surface of the tower.

A linear groove is formed in the frame 11 in the diameter direction to guide the sliding operation of the block 61, and the block 61 is disposed in the linear groove and slides.

The hydraulic cylinder 62 is disposed outside the block 61 in the diameter direction. One end of the cylinder is coupled to the frame 11, and a piston tip is coupled to the block 61, such that the block 61 is extended forward inward in the diameter direction or retracted outward in the diameter direction relative to the frame 11 by the extension or contraction of the hydraulic cylinder 62.

The friction pad 63 is coupled to a tip of the block 61 in the diameter direction, and an outer surface of the friction pad 63 is configured to come into contact with the surface of the tower 1.

Typically, the tower of the wind power generation system is formed to become narrower upward, and the surface of the tower also has a corresponding inclination. The outer surface of the friction pad 63 of the brake device 60, which is configured to come into contact with the surface of the tower, is configured to have a gradient corresponding to an inclination identical to the inclination of the surface of the tower.

The inclination of the tower may vary depending on the type of wind power generation system. The friction pads of the brake devices may be used by being changed to be suitable for the inclination of the tower.

In the embodiment, six brake devices 60, which are configured as described above, may be installed on the frame 11 of the upper base, and the brake devices 60 are spaced apart from one another in a circumferential direction of the tower. The number and the arrangement of brake devices 60 may be adjusted and changed. One or two brake devices may be installed for each of the four sides of the frame 11, and the brake devices may be installed at equal intervals in the circumferential direction of the tower.

With the above-mentioned configuration, when the hydraulic cylinder 62 of the brake device 60 is extended, the block 61 moves inward in the diameter direction, i.e., the direction in which the block 61 moves toward the surface of the tower, such that the block 61 presses the friction pad 63 against the surface of the tower. Therefore, the frictional force may be applied between the surface of the tower and the friction pad 63, such that the upper base 10 may be fixedly supported at any point on the tower 1.

When the hydraulic cylinder 62 is contracted, the block 61 moves outward in the diameter direction, i.e., the direction in which the block 61 moves away from the surface of the tower, such that the friction pad 63 moves away from the surface of the tower. Therefore, the upper base 10 is movable upward or downward relative to the tower 1 in this state.

Meanwhile, the six friction pads 63, which are disposed to surround the tower, each have an outer surface in the diameter direction, i.e., a back surface opposite to the surface configured to come into contact with the surface of the tower, and wires 65 surround the outer surfaces of the friction pads 63. The wires are provided as a set of wires including two wires disposed at an upper side of the friction pad 63, and two wires disposed at a lower side of the friction pad 63.

The wire 65 is disposed in a state in which one end thereof is fixed to one friction pad 63 and extends in the circumferential direction of the tower 1, such that the wire 65 is placed on the inner surfaces of all the six friction pads 63. The other end of the wire 65 is coupled to an electric winch 66 provided on the frame 11. FIG. 3 illustrates a state in which only a portion of the electric winch 66 around which one set of wires are wound is exposed.

With this configuration, when the electric winch 66 operates to pull the wire 65, the wire 65 disposed in the circumferential direction is contracted inward in the diameter direction and presses the friction pad 63 inward in the diameter direction.

When the operation of the electric winch 66 is stopped, the wire 65 is maintained to surround all the six friction pads 63, and this state is maintained as long as the electric winch 66 operates reversely.

The pressing forces applied to the friction pads 63 by the hydraulic cylinders 62 may be inadvertently reduced or lost because leaks or breakdowns of the hydraulic cylinders 62 or a leak or breakdown of a hydraulic pressure supply system.

However, in the embodiment, the wire 65 is wound around the winch 66 and restrained so that the friction pads 63 are not withdrawn outward in the diameter direction in the state in which the friction pads 63 are pressed and in contact with the surface of the tower 1 by the pressing force of the hydraulic cylinders 62. Therefore, the friction pads 63 are not separated from the surface of the tower even when the pressing forces of the hydraulic cylinders 62 are lost.

Therefore, even when the pressing forces of the hydraulic cylinders 62 are reduced or lost, an accident in which the upper base 10 inadvertently falls by gravity is prevented.

The above-mentioned configurations of the brake devices 60 and the wires 65 are also equally provided to the lower base 20 and the lifting base 30.

In order to install the crane apparatus on the tower, the crane apparatus is divided into several modules or units and transported from the manufacturing site or the like, and then the crane apparatus is assembled to the tower on the site. The elevation units are manufactured such that the frames 11, 21, and 31, which constitute the upper and lower bases 10 and 20 and the lifting base 30, are each divided into two pieces. Therefore, one piece of each of the upper and lower bases 10 and 20 may be assembled in the state in which the frame is divided into the two pieces, and the posts 50, the hydraulic cylinders 40, and the brake devices 60 may be installed on the each of the upper and lower bases 10 and 20.

The elevation units, which each have the assembled halves, the two crane units, and the lifting unit are transported to the site by separate transport means, and the elevation units, the two crane units, and the lifting unit are assembled to the tower by using separate cranes at the site.

An operation in which the crane apparatus moves upward along the tower will be described with reference to FIGS. 4 to 6.

These drawings illustrate a part of a process in which the crane apparatus is autonomously moved upward along the tower in a state in which the elements, which constitute the crane apparatus in the embodiment, are transported and installed at a lower end of the tower of the wind power generation system.

Figure 4:
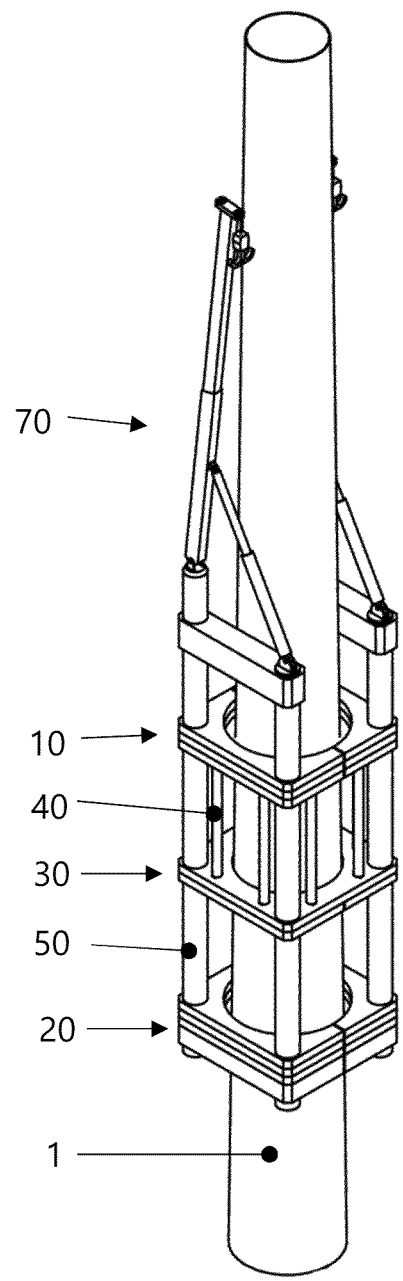
FIGS. 4 to 6 are perspective views sequentially illustrating an operation in which an elevation unit of the crane apparatus according to the embodiment of the present invention moves the tower upward.

FIG. 4 illustrates a state in which the elements, which constitute the crane apparatus, are transported and installed at the lower end of the tower of the wind power generation system.

The elevation units 10 to 50 of the crane apparatus are installed and fixedly supported on the tower, and the two crane units are installed on the upper base 10 of the elevation unit. The lifting unit 80 is not suspended from the crane units 70. The lifting unit 80 is suspended from the crane units 70 after the crane apparatus moves upward to the working position.

In an initial state illustrated in FIG. 4, pistons of the hydraulic cylinders 40 provided between the lifting base 30 and the upper base 10 are contracted, and the lifting base 30 is placed between the upper base and the lower base 20.

In this state, in the upper and lower bases 10 and 20 and the lifting base 30, the brake devices operate, such that the friction pads 63 apply the frictional forces by being pressed against the surface of the tower 1, and the wire 65 is wound by the electric winch 76 and is in close contact with the friction pads 63. Therefore, the upper and lower bases 10 and 20 and the lifting base 30 are fixedly supported on the tower 1.

Next, in the upper and lower bases 10 and 20, the pressing forces, which are applied to the surface of the tower 1 by the friction pads 63 are lost when the hydraulic cylinders 62 of the brake devices are contracted. Therefore, the frictional force between the friction pad 63 and the surface of the tower is lost, and the friction pads 63 just face the surface of the tower.

Next, the pistons of the hydraulic cylinders 40 between the upper base 10 and the lifting base 30 are extended. Because the lifting base 30 is fixedly supported on the tower and the frictional forces of the friction pads 63 of the upper and lower bases 10 and 20 are lost, the crane apparatus, which includes the upper and lower bases 10 and 20 and the crane units 70 and excludes the lifting base 30, are moved upward along the tower by the extension of the hydraulic cylinder 40.

In this case, the posts 50, which connect and couple the upper and lower bases 10 and 20, slide relative to the frame 31 of the lifting base fixedly supported on the tower.

Because the diameter of the tower 1 decreases upward, the distances between the surface of the tower and the friction pads 63 of the brake devices of the upper and lower bases 10 and 20 may increase.

However, in the crane apparatus of the embodiment, the hydraulic cylinders 62 of the brake devices of the upper and lower bases 10 and 20 are extended and the electric winch pulls the wire 65 while being synchronized with the extension operations of the hydraulic cylinders 40 provided between the upper base 10 and the lifting base 30.

Therefore, when the upper and lower bases 10 and 20 move upward, the friction pads 63 are moved upward in the state in which the friction pads 63 are in close contact with the surface of the tower without being spaced apart from the surface of the tower. Therefore, the upper and lower bases 10 and 20, which are not fixedly supported on the tower, are prevented from swaying even when an external force is applied to the crane apparatus because of strong wind or other accidental factors.

The extension operation is stopped after the hydraulic cylinder 40 is extended by a preset length.

With the above-mentioned operation, the crane apparatus, which excludes the lifting base 30, is disposed at a position raised along the tower by a displacement of the extension operation of the hydraulic cylinder 40.

Figure 5:
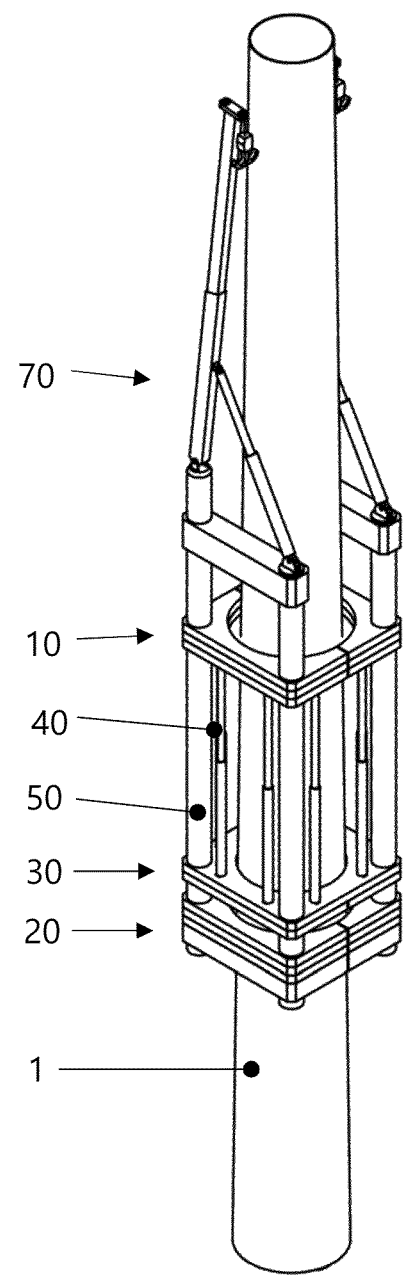

This state is illustrated in FIG. 5.

Next, the brake devices 60 of the upper and lower bases 10 and 20 operated, and the upper and lower bases 10 and 20 are fixedly supported on the tower at the raised position.

Next, the hydraulic cylinders 62 of the brake device of the lifting base 30 are contracted, and the frictional forces between the friction pads 63 and the surface of the tower are lost.

Next, when the pistons of the hydraulic cylinders 40 are contracted, the distance between the lifting base 30 and the upper base 10 decreases, such that the lifting base 30, which is not fixedly supported on the surface of the tower, moves upward, and the upper and lower bases 10 and 20 are fixedly supported in place.

The hydraulic cylinders 62 of the brake device installed on the lifting base 30 are also extended while being synchronized with the contraction operations of the hydraulic cylinders 40 that move the lifting base 30 upward, such that the friction pads 63 are maintained to be in contact with or adjacent to the surface of the tower having the decreased diameter, and the wire 65 is also pulled.

When the hydraulic cylinders 40 are completely contracted, the upward operation of the lifting base 30 is stopped, and the brake device of the lifting base 30 operates, such that the lifting base 30 is also maintained to be fixedly supported on the surface of the tower by the frictional force.

Figure 6:
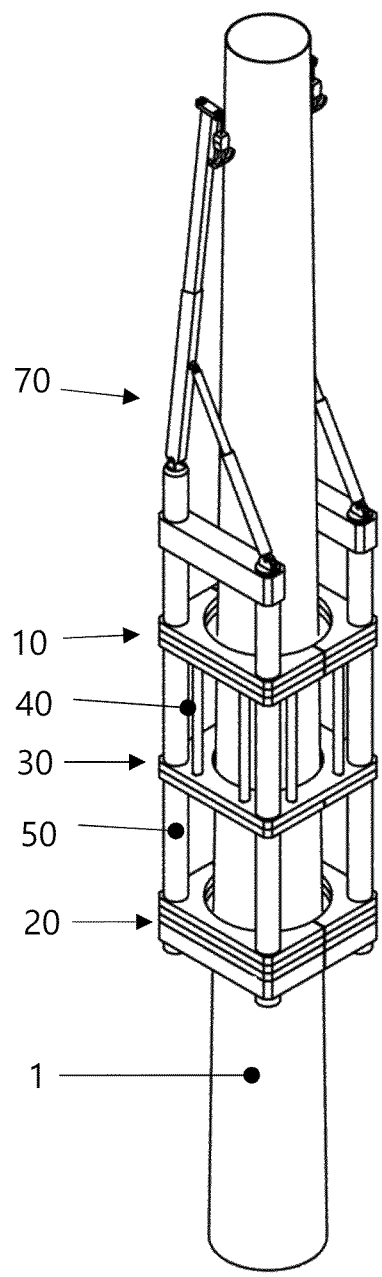

This state is illustrated in FIG. 6. In this state, a height of the crane apparatus has been raised in comparison with the initial state illustrated in FIG. 4, and the elements, which constitute the crane apparatus, are kept in the initial state.

In this state, the above-mentioned operation is repeated until the crane apparatus reaches a preset working height.

When the crane apparatus moves upward to the working position, all the upper and lower bases 10 and 20 and the lifting base 30 are kept fixedly supported on the tower by the brake devices. Therefore, the stably supported state may be maintained during a working process of raising an item suspended from the crane unit 70 or the lifting unit 80.

During the working process, because of a leak or fracture of the hydraulic pressure system, the hydraulic cylinder 62 of the brake device may not be operated, and the pressing force cannot be applied to the friction pad 63.

The state in which the friction pads 63 are pressed against the surface of the tower by the wire 65, which surrounds the friction pads 63, is maintained even when the pressing force applied by the hydraulic cylinder 62 of the brake device is lost. Therefore, the frictional forces between the surface of the tower and the friction pads 63 of the lifting base 30 and the upper and lower bases 10 and 20 are not lost, such that the crane apparatus does not fall onto the ground surface by gravity.

In a state in which the pressing force applied by the hydraulic cylinder 62 of the brake device is lost, the crane apparatus may be moved downward from the tower by gravity when only the frictional force, which is not sufficient to maintain the crane apparatus in position, is applied between the friction pad 63 and the surface of the tower because of the elastic extension of the wire 65 or the deformation of the friction pad 63.

However, because the surface of the tower is inclined, the friction pad 63 is placed on a portion of the surface of the tower, which has a larger diameter, when the crane apparatus slightly moves downward. However, a high pressing force is applied in the diameter direction by the wire 65 placed on the outer surface of the friction pad 63.

Therefore, the crane apparatus is kept in position without further moving downward, which prevents a falling accident. In this state, the hydraulic pressure system or the hydraulic cylinder may be repaired.

Meanwhile, the above-mentioned operation is performed reversely in case that the working process is completed by the crane apparatus or the crane apparatus is moved downward from the tower because of the necessity of work.

When the hydraulic cylinders 40 between the lifting base 30 and the upper base 10 are extended in the state illustrated in FIG. 6, the lifting base 30, which is not fixed to the tower, is moved downward and fixed to the tower, such that the state illustrated in FIG. 5 is implemented.

Next, the hydraulic cylinders 40 are contracted in the state in which the lifting base 30 is fixed to the tower and the upper and lower bases 10 and 20 are unfixed. Therefore, the upper and lower bases 10 and 20 move downward, and the crane unit 70 mounted on the upper and lower bases 10 and 20 moves downward.

With the above-mentioned method, the crane apparatus is moved downward to the ground surface and sequentially disassembled, and the disassembled crane apparatus is loaded onto a transport vehicle by a separate crane.

In the embodiment, the hydraulic cylinder 40 may be installed between the upper base 10 and the lifting base 30. However, on the contrary, the hydraulic cylinder 40 may be installed between the lower base 20 and the lifting base 30.

During the upward operation of the crane apparatus configured as described above, the lifting base moves upward as the hydraulic cylinders are extended in the state in which the upper and lower bases are fixed to the tower, and the upper and lower bases move upward as the hydraulic cylinders are contracted in the state in which the lifting base is fixed to the tower.

During the downward operation, the upper and lower bases move downward as the hydraulic cylinders are extended in the state in which the lifting base is fixed to the tower, and the lifting base moves downward as the hydraulic cylinders are contracted in the state in which the upper and lower bases are fixed to the tower.

In addition, in the embodiment, the piston tip of the hydraulic cylinder is coupled to the upper base, and the cylinder is coupled to the lifting base. However, on the contrary, the piston tip may be coupled to the lifting base, and the cylinder may be coupled to the upper or lower base. Even in this configuration, the operation is performed in the same way.

Next, a configuration of the crane unit 70 will be described with reference to FIG. 7.

The upper end of the post 50 may extend upward while penetrating the frame 11 of the upper base. A reinforcement frame 51 is connected between the upper ends of the two posts 50.

One crane unit 70 is installed at the upper ends of the two posts 50 connected to each other by the reinforcement frame 41. The crane units 70 are installed and disposed side by side with the tower interposed therebetween.

The crane units 70 each include first and second movable beams 71 and 72 having one end rotatably coupled to a hinge 711 provided at an upper end of one post 50, a hydraulic cylinder 73 rotatably coupled to an end of a hinge 731 provided at an upper end of another post 50, a wire 75 wound around rollers 721 provided at a tip of the second movable beam 72, the wire 75 being operated to be wound by a non-illustrated electric winch, and a raising hook 76 suspended from the wire.

The first movable beam 71 is rotatably coupled to the hinge 711 provided at the upper end of the post 50, the second movable beam 72 is disposed coaxially with the first movable beam and inserted into the first movable beam 71, and the second movable beam 72 is extended and protrude from the first movable beam or is contracted and retracted into the first movable beam 71 by hydraulic pressure. Therefore, a length of the first and second movable beams 71 and 72 between the hinge and the tip increases or decreases as the first and second movable beams 71 and 72 rotate about the hinge 711.

The end of the hydraulic cylinder 73 is coupled to the hinge 731 provided at the upper end of the post 50, and the tip of the piston 731 is coupled to the hinge 731 provided at a middle portion of the first movable beam 71, such that the first and second movable beams 71 and 72 rotate about the hinge 711 by the extension or contraction operation of the hydraulic cylinder 73.

The two rollers 721 are provided at the tip of the second movable beam 72. The rollers 721 define suspension points. The wires 75 pass over the rollers 721 while being wound around the rollers 721. The raising hook 76 is attached to a tip of the wire. The remaining part of the wire 75 passes over the rollers 721 and is wound around and pulled by the electric winch (not illustrated) or unwound, such that the raising hook 76 attached to the tip of the wire moves upward or downward.

The lifting unit 80 is suspended from the raising hooks 76.

The lifting unit 80 is a unit for raising the element of the wind power generation system, but the lifting unit 80 may be used, as necessary. The crane unit 70 may directly suspend an item from the raising hook 76 and then raise the item without using the lifting unit.

Because the two crane units 70 are installed side by side, the item may be suspended from the raising hooks 76 of the two crane units and then raised. Alternatively, in accordance with an installation position or weight of an item, only the single crane unit 70 may be used to raise the item.

The lifting unit 80 may not be installed together with the crane apparatus at the time of installing the crane apparatus on the tower. After the elevation units 10 to 50 and the crane unit 70 may be installed on the tower 1 without the lifting unit, the raising hooks 76 of the crane unit 70 may be moved downward to be close to the ground surface, and the lifting unit 80 may be suspended from the raising hooks and used at the time of raising the element of the wind power generation system from the ground to the installation position of the wind power generation system.

A configuration of the lifting unit 80 in a state of being suspended from the crane units 70 and a configuration in which the lifting unit 80 is suspended from the crane units 70 will be described with reference to FIGS. 8 and 9.

Figure 7:
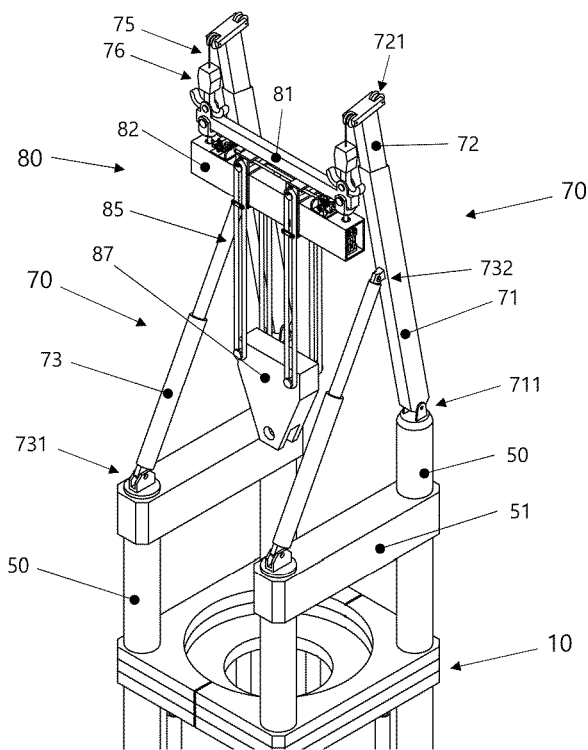
FIG. 7 is a perspective view illustrating a crane unit and the lifting unit of the crane apparatus according to the embodiment of the present invention.
Figure 8:
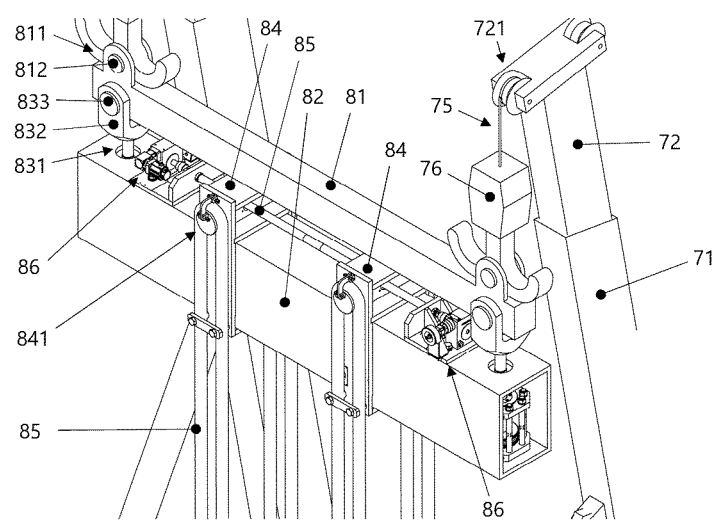
FIG. 8 is an enlarged perspective view of the lifting unit in FIG. 7.
Figure 9:
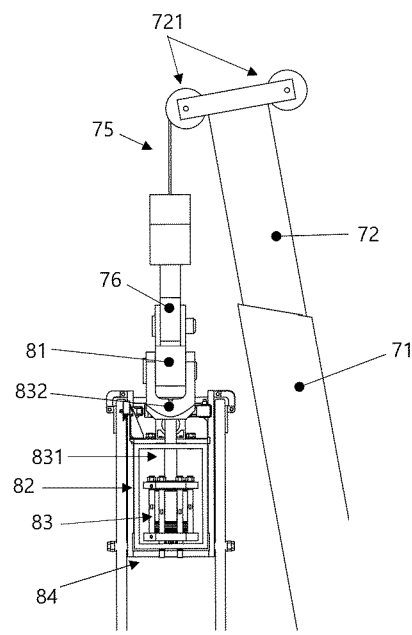
FIG. 9 is an enlarged side view of the lifting unit in FIG. 7.

FIGS. 8 and 9 are enlarged views illustrating a state in which the lifting unit 80 in FIG. 7 is suspended from the crane units 70.

The lifting unit 80 includes a first beam 81 elongated, and a second beam 82 disposed below the first beam and elongated approximately in parallel with the first beam.

Hinges 811 are provided at two opposite ends spaced apart from each other toward two opposite sides from a center of the first beam 81 in a length direction. The raising hooks 76 of the crane units 70 are respectively coupled to the hinges 811 by pins 812, such that the first beam 81 is suspended from the two crane units 70.

The second beam 82 is configured as a channel having a quadrangular cross-section. Hydraulic cylinders 83, which are configured as horizontal adjustment means, are provided inside the channel and disposed at two opposite ends spaced apart from each other toward two opposite sides from the center of the second beam 82 in a length direction.

The hydraulic cylinders 83 are fixedly coupled to the second beam 82. Hinges 832 are attached to piston tips 831, and the hinges 832 may be coupled by pins 833 that penetrate positions of the two opposite ends spaced apart from each other toward the two opposite sides from the center of the first beam 81.

With this configuration, distances between the second beam 82 and the points to which the first beam 81 is coupled by the pins 833 are adjusted by the extension and contraction operations of the hydraulic cylinder 83. Because the first beam 81 and the second beam 82 are coupled to each other at the ends, which are spaced apart from each other toward the two opposite sides from the center based on the length direction, by means of the hydraulic cylinders 83, a posture of the second beam 82 with respect to the first beam 81 is adjusted by the distance adjustment performed by the extension and contraction operations of the hydraulic cylinders 83.

The first beam 81 of the lifting unit 80 may be adjusted to be horizontal with respect to the ground surface by the operation of winding or unwinding the wires 75 of the crane units 70 or the operation of rotating the first and second movable beams 71 and 72 of the crane units 70.

Because the crane unit 70 is configured to operate while supporting a high load, the hydraulic cylinder 73 for rotating the first movable beam 71 has a large capacity, and the electric winch for winding the wire 75 has a large capacity. Therefore, the process of operating the hydraulic cylinder 73 and the electric winch of the crane unit 70 to finely adjust the horizontality of the first beam 81 of the lifting unit is not appropriate. In particular, the frequent process of finely adjusting the horizontality may damage these devices.

However, in the embodiment, after the first beam 81 is suspended from the crane unit 70 so that the first beam 81 is close to the horizontality, the posture of the second beam 82 with respect to the first beam 81 is adjusted by using the hydraulic cylinders 83 of the lifting unit, such that the second beam 82 may be horizontal to the ground surface or have a required posture.

Two raising blocks 84 are provided on the second beam 82. The two raising blocks 84 are disposed on the second beam so that the positions of the raising blocks 84 vary in the length direction of the second beam.

The raising blocks 84 each have a shape having a quadrangular cross-section that surrounds the entire second beam 82. The raising block 84 is configured to slide in the length direction of the second beam 82. A pin 841 protrudes from a lateral side of the raising block 84. A raising jig (86 in FIG. 5) from which the element, which constitutes the wind power generation system, is suspended from a sling 85. The sling 85 is wound around the pin 841.

A lead screw 85 is coupled to a portion of the raising block 84 that is placed at an upper side of the second beam 82. The lead screw 85 constitutes a position adjustment device for adjusting a position of the raising block in the length direction.

The lead screw 85 extends in the length direction of the second beam 82, and one end of the lead screw 85 receives a rotational force from a drive motor 86 equipped with a speed reducer. The position of the raising block 84 on the second beam 82 is adjusted in the length direction by a rotation of the lead screw 85.

Therefore, the sling 85, which is wound around the pin of the raising block 84, may be placed at a winding position of the sling with respect to the item to be raised. Even after the item is raised by the sling 85, the position of the item may be adjusted in the length direction of the second beam 82 by adjusting the position of the raising block 84.

A process of raising an item by using the crane apparatus configured as described above will be described.

Figure 10:
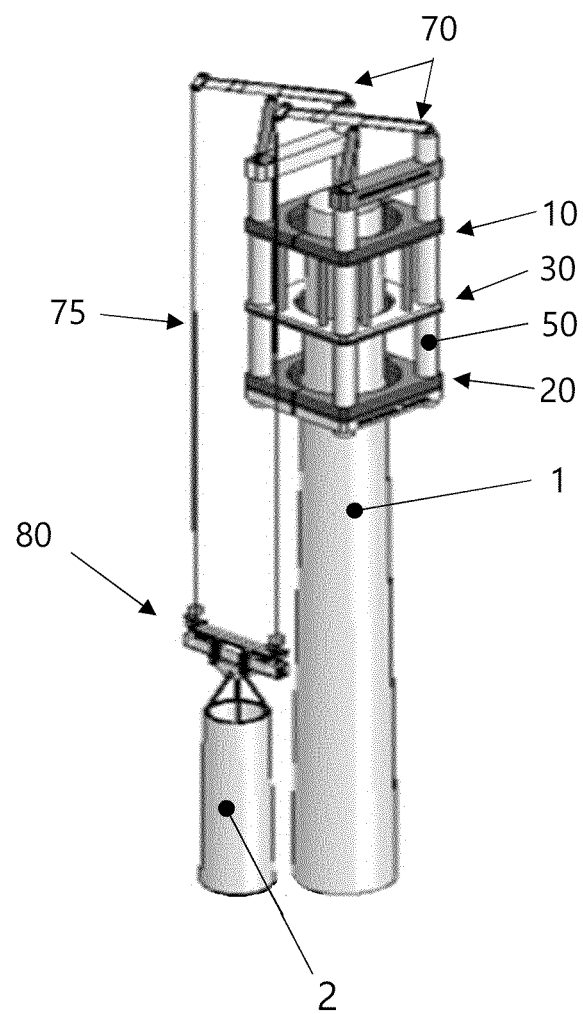
FIGS. 10 to 12 are perspective views sequentially illustrating an operation in which the crane apparatus according to the embodiment of the present invention raises a tower unit.
Figure 11:
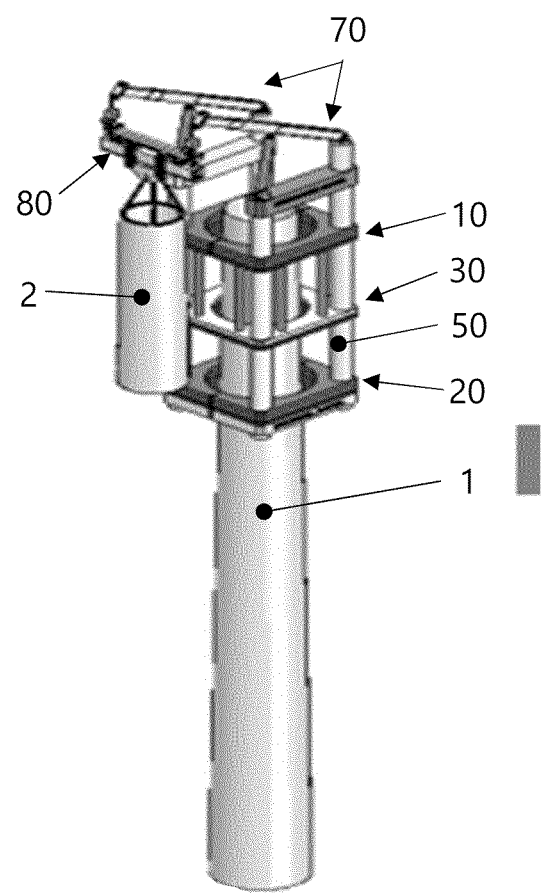
Figure 12:
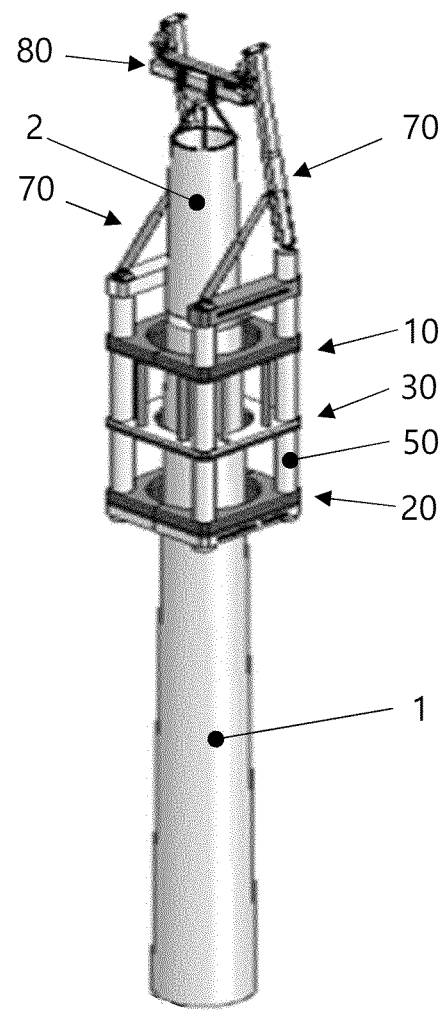

FIGS. 10 to 12 sequentially illustrate a process of installing a lower portion of the tower on the ground surface and installing a tower unit 2, which constitutes the tower, on the lower portion of the installed tower during a process of constructing the wind power generation system.

When a trailer (not illustrated), on which the tower unit 2 is loaded, arrives at the construction site for the wind power generation system, a separate crane apparatus (not illustrated) lifts up the tower unit 2 from the trailer.

On the basis of the processes described with reference to FIGS. 4 to 6, the crane apparatus of the embodiment is installed on the lower portion of the tower 1 and moved upward toward a location above the lower portion of the tower. The two crane units 70 installed on the upper portion of the elevation unit lower the raising hooks toward the ground surface at one side of the tower 1.

The lifting unit 80 is suspended from the two raising hooks, and the horizontal posture of the lifting unit 80 is adjusted by the hydraulic cylinders 83 of the lifting unit 80.

The jig (86 in FIG. 8), which is suitable to suspend the tower unit 2, is suspended from the sling 85 provided on the raising block of the lifting unit 80, and the tower unit 2 is fixed to a jig 87 and suspended from the lifting unit 80.

This state is illustrated in FIG. 10.

As illustrated in FIG. 11, in the crane apparatus of the embodiment, the wires 75 of the two crane units 70 are synchronized and wound, and the lifting unit 80 and the tower unit 2, which is suspended from the lifting unit 80, are raised upward in a state in which the lifting unit 80 and the tower unit 2 are approximately parallel to the tower 1, and a centerline of the tower unit 2 is coincident with a centerline of the tower 1.

The two crane units 70 are provided above the upper base 10, which is installed to surround the tower 1, and disposed side by side with the tower 1 interposed therebetween, and the two opposite ends of the lifting unit 80 are suspended from the two crane units 70, such that the tower unit 2 suspended from the lifting unit 80 may be raised in the state in which the centerline of the tower unit 2 is coincident with the centerline of the tower 1.

When the tower unit 2 is positioned above the installed tower 1, the hydraulic cylinders 73 of the crane units 70 are extended, and the movable beams 71 and 72 are rotated, such that as illustrated in FIG. 12, the tower unit 2 is moved to a position that defines concentricity with the previously installed tower.

The position of the tower unit 2 is fitted with the position of the tower 1 by the operations of the movable beams 71 of the crane units 70 and the operations of the raising blocks 84 of the lifting unit 80 that move relative to the second beam 82, and then the assembling process may be performed.

During the above-mentioned process, the crane units 70 for raising the tower unit 2 are disposed to be spaced apart from each other toward the two opposite sides from the centerline of the tower 1, such that eccentricity of a load applied to the tower 1 is minimized. In particular, in the state in which the tower unit 2 is positioned approximately above the tower 1, a weight of the crane apparatus in the embodiment, in which the tower unit 2 and the tower are installed, is not eccentrically applied to the tower 1.

In addition, a very fine operation is required for the process of coupling the tower unit 2 to the upper end of the tower 1, and the operation may be implemented as the movement of the raising block 84 of the lifting unit 80 while minimizing the operation of the crane unit 70.

Next, a process of coupling a blade 8 to the wind power generation system and decoupling the blade 8 by using the crane apparatus of the embodiment will be described with reference to FIG. 13.

Figure 13:
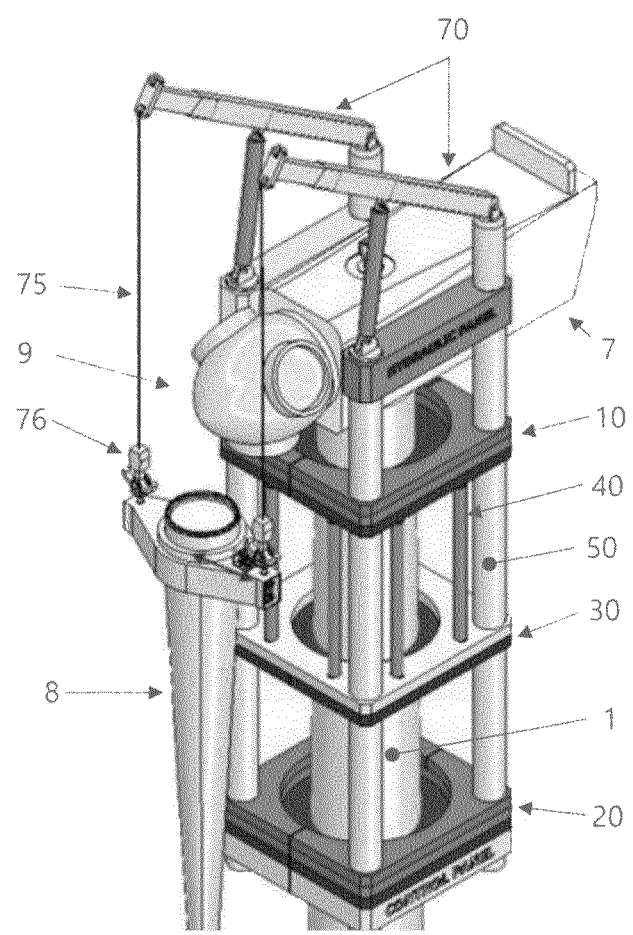
FIG. 13 is a perspective view illustrating an operation in which the crane apparatus according to the embodiment of the present invention raises a blade.

During the process illustrated in FIG. 13, the blade 8 is installed on a hub 9 provided on a nacelle 7 only by using the two crane units 70 without using the lifting unit 80.

The blade 8 is raised in a state in which an end of the blade 8, which is coupled to a turbine shaft 9, is suspended from the two crane units 70.

A vertical state of the blade 8 may be maintained by adjusting the lengths of the wires 75 of the two crane units 70. Of course, the angle and position of the end of the blade 8 may be adjusted, in a state in which the blade 8 may be assembled to the turbine shaft 9, by adjusting the rotation angles and lengths of the movable beams 71 and 72 of the two crane units 70.

The configuration and operation of the self-climbing type crane apparatus according to the present invention have been described above. The present invention is not limited to the embodiment, and various alterations and modifications and addition of constituent elements are enabled within the scope defined by the appended claims, and the crane apparatus, which is implemented by various alterations and modifications and the addition of the constituent elements, falls within the scope of the present invention.

The invention claimed is:

1. A crane apparatus for installing and maintaining a tower and a wind power generation system provided at an upper end of the tower, the crane apparatus comprising:
    an elevation unit attached to the tower and configured to be movable upward or downward vertically along the tower; and
    a crane unit disposed above the elevation unit and configured to raise an element that constitutes the wind power generation system,
    wherein the elevation unit comprises:
    upper and lower bases configured to surround the tower and switch between a state in which the upper and lower bases are fixedly supported at any position on the tower and a state in which the upper and lower bases are movable upward or downward relative to the tower;
    a plurality of posts extending between the upper and lower bases and configured to allow the upper and lower bases to be fixed to each other at a position at which the upper and lower bases are spaced apart from each other vertically;
    a lifting base configured to surround the tower and switch between a state in which the lifting base is fixedly supported at any position on the tower and a state in which the lifting base is movable upward or downward relative to the tower, the lifting base being disposed to be movable upward or downward between the upper and lower bases along the posts; and
    a drive device disposed between the lifting base and the upper base or lower base and configured to change distances between the lifting base and the upper and lower bases by changing a length thereof,
    wherein the plurality of posts is disposed to be spaced apart from one another in a circumferential direction of the tower and penetrates the lifting base so that the lifting base is slidable,
    wherein the lifting base moves upward or downward along the tower as the length of the drive device is changed in a state in which the upper and lower bases are fixedly supported at any position on the tower,
    wherein the upper and lower bases move upward or downward along the tower as the length of the drive device is changed in a state in which the lifting base is fixedly supported at any position on the tower, and
    wherein the crane unit is disposed on the upper base.

2. The crane apparatus of claim 1, wherein the upper and lower bases and the lifting base respectively include frames extending on planes perpendicular to an extension direction of the tower,
    wherein holes, which are penetrated by the tower, are respectively formed in the frames,
    wherein the frames are each configured to be divided and coupled so that the hole penetrated by the tower is opened, and
    wherein a plurality of hydraulic cylinders is provided as the drive device and extends between the frame of the lifting base and the frame of the upper or lower base, and the plurality of hydraulic cylinders is operated to be extended or contracted and disposed to be spaced apart from one another in the circumferential direction of the tower.

3. The crane apparatus of claim 1, wherein brake devices are provided and configured to selectively apply frictional forces in a diameter direction of the tower between the brake devices and a surface of the tower so that the upper and lower bases and the lifting base are fixedly supported at any position on the tower by the applied frictional forces, and
    wherein the plurality of brake devices is respectively disposed on the upper and lower bases and the lifting base and spaced apart from one another in the circumferential direction of the tower.

4. The crane apparatus of claim 3, wherein the upper and lower bases and the lifting base respectively include frames extending on planes perpendicular to an extension direction of the tower, and
    wherein the brake device comprises:
    a block disposed on the frame and configured to be slid in the diameter direction of the tower by a hydraulic cylinder; and
    a friction pad disposed at a tip of the block and configured to apply a frictional force while coming into contact with the surface of the tower.

5. The crane apparatus of claim 4, further comprising:
    a wire device disposed to extend along outer surfaces of the friction pads of the brake devices in the diameter direction and configured to prevent the friction pads from moving outward in the diameter direction of the tower.

6. The crane apparatus of claim 5, wherein the wire device comprises:
    an electric winch disposed on the frame of each of the upper and lower bases and the lifting base; and
    a wire having one end fixed to any one of the friction pads, and the other end coupled to the electric winch.

* * * * *